US012789718B2

(12) United States Patent
Nakagawa et al.

(10) Patent No.: US 12,789,718 B2
(45) Date of Patent: Nov. 10, 2026

(54) WORK VEHICLE

(71) Applicant: Yanmar Holdings Co., Ltd., Osaka (JP)

(72) Inventors: Yohei Nakagawa, Okayama (JP); Soshi Nomoto, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 535 days.

(21) Appl. No.: 18/142,587

(22) Filed: May 3, 2023

(65) Prior Publication Data

US 2023/0365072 A1 Nov. 16, 2023

(30) Foreign Application Priority Data

May 12, 2022 (JP) ................................ 2022-078638

(51) Int. Cl.

*B60R 11/02* (2006.01)
*B62D 33/06* (2006.01)
*B62D 49/06* (2006.01)
*H01Q 1/32* (2006.01)
*B60R 11/00* (2006.01)

(52) U.S. Cl.

CPC ...... *B60R 11/0258* (2013.01); *B62D 33/0625* (2013.01); *B62D 49/06* (2013.01); *H01Q 1/3233* (2013.01); *H01Q 1/3275* (2013.01); *B60R 2011/004* (2013.01)

(58) Field of Classification Search

CPC ........ B60R 11/0258; B60R 2011/0028; B62D 33/0625; B62D 49/06; E02F 9/0858; H01Q 1/3233; H01Q 1/3275; H01Q 1/3291; H01Q 1/3208; G01C 21/265

USPC .......... 296/193.12, 190.08, 193.02; 701/444; 343/713, 714

See application file for complete search history.

(56) References Cited

U.S. PATENT DOCUMENTS 11,529,920 B2 * 12/2022 Misaki .................... B60R 11/02
11,780,499 B2 * 10/2023 Kobayashi ........... B60K 17/165 701/41
11,912,205 B2 * 2/2024 Takase ................... G05D 1/248
2008/0265624 A1 * 10/2008 Takano ................ B62D 33/073 296/190.01
2020/0251809 A1 * 8/2020 Hanada ................... G01S 19/36
2020/0398780 A1 * 12/2020 Kobayashi ........... A01B 69/008
2021/0122391 A1 * 4/2021 Hanada ................... B60R 11/02
2021/0284244 A1 * 9/2021 Ries ....................... B62D 25/06
2021/0300483 A1 * 9/2021 Misaki .................... B60R 1/006

(Continued)

FOREIGN PATENT DOCUMENTS

JP 2019108109 A 7/2019
JP 2020196318 A * 12/2020

(Continued)

OTHER PUBLICATIONS

Notice of Reasons for Refusal: Patent Application No. JP2022-078638; Date: Sep. 25, 2025.

*Primary Examiner* — Wenwei Zhuo
(74) *Attorney, Agent, or Firm* — Chris Mizumoto

(57) ABSTRACT

An example work vehicle includes: a driver's seat; a canopy that is disposed above the driver's seat; a support portion that supports the canopy; and a positioning antenna that receives a signal from a positioning satellite. The positioning antenna is disposed below the canopy and above the support portion.

9 Claims, 10 Drawing Sheets

(56) References Cited

U.S. PATENT DOCUMENTS

| | | | | |
|---|---|---|---|---|
| 2022/0105875 | A1 * | 4/2022 | Misaki | B60R 11/00 |
| 2022/0204098 | A1 * | 6/2022 | Kobayashi | B62D 21/14 |
| 2023/0076382 | A1 * | 3/2023 | Ishino | A01B 69/003 |

FOREIGN PATENT DOCUMENTS

| | | | | | |
|---|---|---|---|---|---|
| JP | 2021070335 | A | * | 5/2021 | |
| JP | 2021153306 | A | | 9/2021 | |
| WO | WO-2021131670 | A1 | * | 7/2021 | G05D 1/248 |

* cited by examiner

WORK VEHICLE

CROSS-REFERENCE

This application claims foreign priority of JP2022-078638, filed May 12, 2022, the disclosure of which is hereby incorporated by reference in its entirety.

TECHNICAL FIELD

The present invention relates to a work vehicle.

BACKGROUND ART

The Patent Document 1 discloses a tractor that includes a rops including left and right vertical frame portions and a lateral frame portion connecting upper ends of the left and right vertical frame portions to each other. An antenna unit of the tractor is disposed at the position behind the lateral frame portion so that the lower end of the antenna unit is disposed below the upper edge of the lateral frame portion. Then, in a front view, at least a part of the antenna unit overlaps with at least a part of the lateral frame portion.

PRIOR ART DOCUMENT

Patent Document

Patent Document 1: Japanese Patent Publication No. 6960865

SUMMARY OF INVENTION

Technical Problem

In a configuration in which, in a front view, at least a part of the antenna unit overlaps with at least a part of the lateral frame portion, the lateral frame portion may disturb the reception of a signal by the antenna unit in a case where, for example, the lateral frame portion is made of metal.

According to the above, the object of the present invention is to provide the technique in which a positioning antenna unit can be appropriately disposed on the work vehicle.

Solution to Problem

An example work vehicle of the present invention includes a driver's seat, a canopy that is disposed above the driver's seat, a support portion that supports the canopy, and a positioning antenna that receives a signal from a positioning satellite. The positioning antenna is disposed below the canopy and above the support portion.

Advantageous Effects of Invention

According to an example of the present invention, the positioning antenna can be appropriately disposed on the work vehicle.

DESCRIPTION OF EMBODIMENTS

An embodiment of the present invention is described with reference to the drawings. Note that, in this embodiment, a tractor is described as one example of a work vehicle. However, the work vehicle may be another work vehicle than the tractor, such as a variety of a harvester, a rice transplanter, a combine, a civil engineering and construction work machine, snow plow car.

Further, in this specification, directions are defined as below. Firstly, forward direction of the tractor (work vehicle) while the tractor is working is defined as "front" and the opposite direction to the front is defined as "rear". Further, the right side of the forward direction of the tractor is defined as the right and the left side is defined as the left. Then, a direction perpendicular to the front-rear direction and the left-right direction of the tractor is defined as an up-down direction. In this case, the gravity direction is the down direction, and the direction opposite to the down direction is defined as the up direction. Further, a plane perpendicular to the up-down direction is defined as a horizontal plane and a direction along the horizontal plane is defined as a horizontal direction. Note that the directions described above are merely designations used for explanation and are not intended to limit the practical positional relationship and directions.

1. Outline of Work Vehicle

Figure 1:
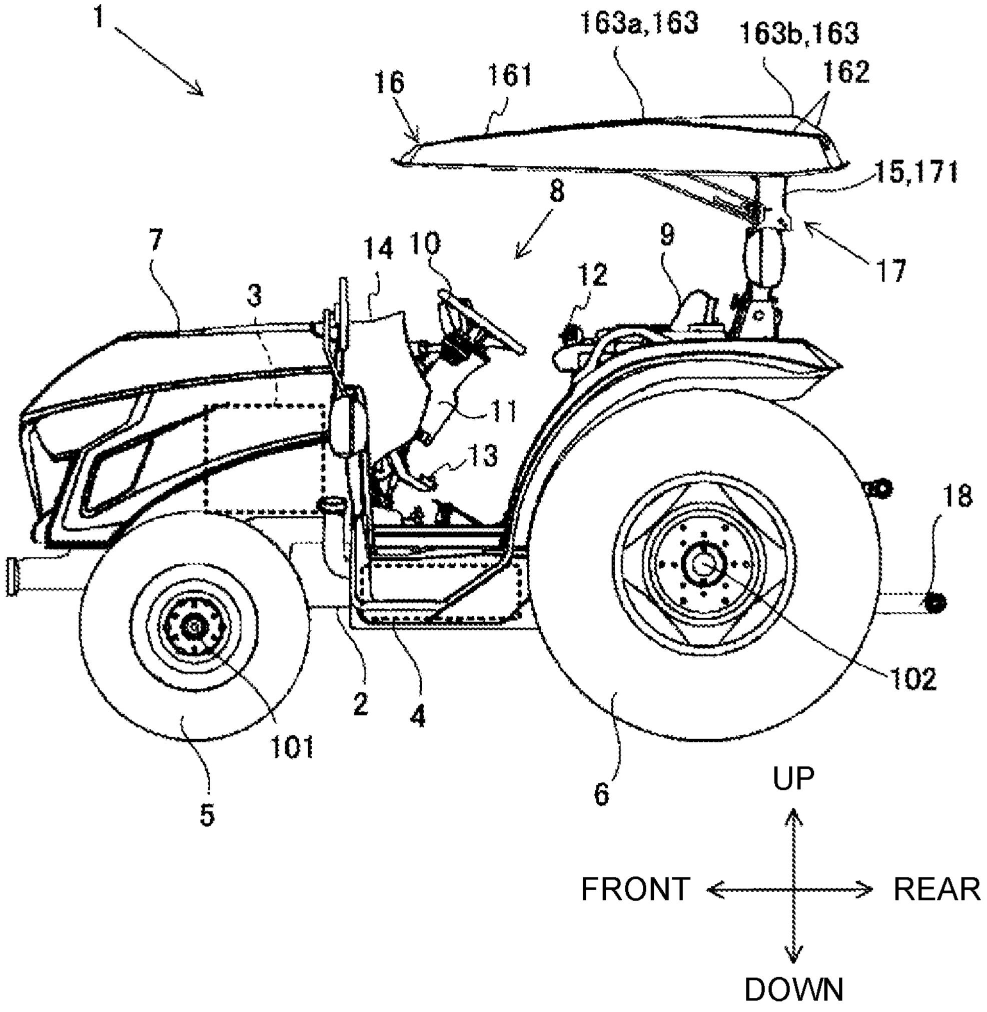
FIG. 1 is a side view illustrating a brief configuration of a tractor.

FIG. 1 is a side view illustrating the brief configuration of a tractor 1 according to this embodiment. As shown in FIG. 1, the tractor 1 includes a vehicle body 2, an engine 3, and a mission case 4.

A pair of left and right front wheels 5 are disposed on a front portion of the vehicle body 2. A pair of left and right rear wheels 6 are disposed on a rear portion of the vehicle body 2. The vehicle body 2 can travel by the front wheels 5 and the rear wheels 6. That is, the tractor 1 of this embodiment is a wheel tractor. However, the tractor 1 may be a crawler tractor.

The engine 3 is disposed on the front portion of the vehicle body 2 so as to be covered by a hood 7. The engine 3 is a driving power source of the tractor 1. In this embodiment, the engine 3 is a diesel engine. However, the engine 3 may be a gasoline engine. Further, the driving power source of the tractor 1 may be another driving power source such as an electric motor instead of the engine.

The mission case 4 is disposed behind the engine 3 and below a driver portion 8. A drive train (not shown) is disposed in the mission case 4. The rotation force of the engine 3 is transmitted to at least one of the front wheels 5 and the rear wheels 6 via the drive train in the mission case 4.

The driver portion 8 is disposed behind the engine 3 on the vehicle body 2. The driver portion 8 is a portion that a driver (operator) gets on. The driver portion 8 includes a driver's seat 9. That is, the tractor 1 includes the driver's seat 9. The driver's seat 9 is a position that the driver sits on.

The driver portion 8 includes a steering wheel 10 disposed in front of the driver's seat 9. That is, the tractor 1 includes the steering wheel 10. The steering wheel 10 is a handle that is manipulated by the driver sitting on the driver's seat 9. The steering wheel 10 is rotatably supported by a steering shaft (not shown) disposed in a steering column 11. Manipulation of rotation of the steering wheel 10 can change the direction of the front wheels 5.

In addition to the above, the driver portion 8 is provided with a manipulation lever 12 and a pedal 13 that are manipulated by the driver. Further, the driver portion 8 is provided with a front panel 14 on which a meter for indicating a velocity of the tractor 1, etc. is disposed. The manipulation lever 12 may include a plurality of levers such as, for example, a main gear shift lever, a sub gear shift lever, and a work lever, etc. Further, the pedal 13 may include a plurality of kinds of pedals such as, for example, an accelerator pedal, a brake pedal, and a clutch pedal, etc.

Further, the tractor 1 includes a rops 15 behind the driver's seat 9. By providing the rops 15, the driver can be protected when the tractor 1 turns over.

Further, the tractor 1 includes a canopy 16 and a support portion 17. The canopy 16 is disposed above the driver's seat 9. The support portion 17 supports the canopy 16. The canopy 16 is a roof that covers the driver portion 8 including the driver's seat 9. The support portion 17 is mounted on the vehicle body 2. The canopy 16 is supported by the vehicle body 2 via the support portion 17. In this embodiment, the support portion 17 includes a frame 171 that configures the rops 15. The canopy 16 and the support portion 17 will be specifically described below.

A work machine connection portion 18 configured by a three-point link mechanism, etc. is provided on the rear portion of the vehicle body 2. A work machine can be connected to the work machine connection portion 18. The work machine may be, for example, a tiller machine, a plough, a fertilizing machine, an agricultural chemicals splaying machine, a harvesting machine, or a reaping machine. Further, an elevating device (not shown) including a hydraulic machine such as an elevating cylinder is provided on the rear portion of the vehicle body 2.

By elevating the work machine connection portion 18 by the elevating machine, the work machine can be elevated. Further, a driving force generated by the engine 3 can be transmitted to the towed work machine via the mission case 4 and the power take-off shaft (PTO shaft; not shown) that is disposed on the rear portion of the vehicle body 2.

Figure 2:
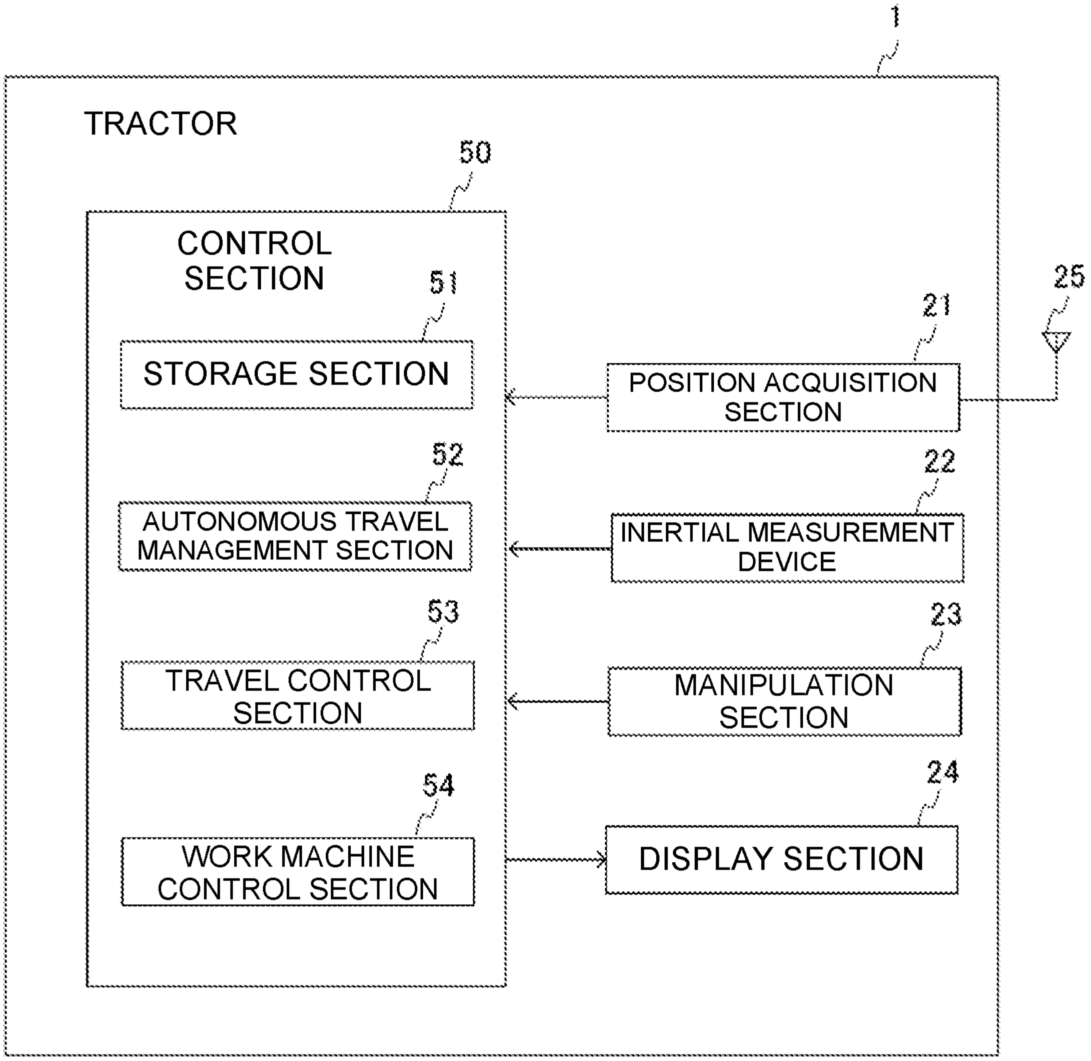
FIG. 2 is a block diagram illustrating a configuration of the tractor.

FIG. 2 is a block diagram illustrating the configuration of the tractor 1 according to this embodiment. As shown in FIG. 2, the tractor 1 includes a control section 50. The control section 50 is a computer configured by including, for example, a computing device, an input-output section, and a storage section 51. The computing device is, for example, a processor or a microprocessor. The storage section 51 is a main storage device such as a Read Only Memory (ROM) and a Random Access Memory (RAM). The storage section 51 may further include a sub storage device such as a Hard Disk Drive (HDD) or a Solid State Drive (SSD). A variety of programs and data are stored in the storage section 51. The computing device reads the variety of programs from the storage section 51 and runs the programs.

By cooperation of the hardware and the software described above, the control section 50 can function as an autonomous travel management section 52, a travel control section 53, and a work machine control section 54. The control section 50 may be a single hardware component, or may be composed of a plurality of hardware components that can communicate with each other. That is, the autonomous travel management section 52, the travel control section 53, and the work machine control section 54 may be composed of a single control device or a plurality of control devices. For example, the autonomous travel management section 52 may be composed of a first control device, the travel control section 53 may be composed of a second control device, and the work machine control section 54 may be composed of a third control device.

Note that, as can be understood from the autonomous travel management section 52 that is included in the tractor 1, the tractor 1 is capable of autonomous traveling. Here, the autonomous traveling means that a device for traveling is controlled by the control section 50 included in the tractor 1, and thereby, at least the steering of the tractor 1 is autonomously performed so that the tractor 1 follows a predetermined route. The autonomous traveling may be configured so that, for example, at least one of a vehicle speed and work conducted by the work machine is autonomously performed in addition to the steering. In this embodiment, the steering is autonomously performed by the autonomous traveling so as to follow a predetermined route. That is, the tractor 1 is configured to be capable of autonomous steering and traveling.

A position acquisition section 21, an inertial measurement device 22, a manipulation section 23, and a display section 24 are connected to the control section 50.

The position acquisition section 21 acquires a position of the tractor 1 as, for example, latitude information and longitude information using a positioning signal received by the positioning antenna 25 from a positioning satellite. The positioning antenna 25 is disposed at the appropriate position on the tractor 1. That is, the tractor 1 includes the positioning antenna 25 that receives a signal from a positioning satellite. The appropriate position at which the positioning antenna 25 is disposed will be described below. The position acquisition section 21 outputs acquired position information of the tractor 1 to the control section 50. The position acquisition section 21 may, for example, receive a positioning signal from a reference station (not shown) in an appropriate manner and conduct positioning by using a well-known Real Time Kinematic GNSS (RTK-GNSS) method. Further, for example, position acquisition section 21 may conduct positioning by using Differential GNSS (DGNSS) method.

The inertial measurement device 22 includes a tri-axial angular velocity sensor and a tri-directional acceleration sensor. The inertial measurement device 22 outputs measured information to the control section 50. By providing the inertial measurement device 22, an inertial information such as a yaw angle, a pitch angle, and a roll angle, etc. of the vehicle body 2 can be measured.

The manipulation section 23 is manipulated by the driver sitting on the driver's seat 9. The manipulation section 23 is provided so that, for example, the driver can conduct a manipulation according to the autonomous traveling of the tractor 1. A command by the driver using the manipulation section 23 is input to the control section 50.

The display section 24 appropriately displays information according to the command from the control section 50. The display section 24 displays, for example, information about the autonomous traveling of the tractor 1.

The autonomous travel management section 52 conducts management about the autonomous traveling. For example, the autonomous travel management section 52 conducts an initiation process and a conclusion process of the autonomous traveling according to the command by the driver using the manipulation section 23. Further, for example, the autonomous travel management section 52 computes the position and the direction of the vehicle body 2 of the tractor 1 based on the information received from the position acquisition section 21 and the inertial measurement device 22. Further, the autonomous travel management section 52 outputs a control command about the autonomous traveling according to a relationship between the computed position of the vehicle body and a predetermined route for the autonomous traveling.

The travel control section 53 controls a travel system of the tractor 1. For example, the travel control section 53 controls an autonomous steering mechanism (not shown) according to the control command from the autonomous travel management section 52 so that the vehicle body 2 of the tractor 1 travels along the predetermined route. Note that the autonomous steering mechanism autonomously rotates the above-described steering shaft disposed in the steering column 11 so as to autonomously change the direction of the front wheel 5. The autonomous steering mechanism includes, for example, a steering motor and a drive train that is composed of a gear mechanism, etc. The action of the steering motor is controlled according to the position of the vehicle body. Since the action of the steering motor is transmitted to the steering shaft via the drive train, manipulation of the direction of the front wheel 5 can be controlled by controlling the steering motor.

The work machine control section 54 controls the work system of the tractor 1. The work machine control section 54 controls elevation of the work machine connection portion 18 according to, for example, manipulation of the manipulation lever 12 provided on the driver portion 8 and the command from the autonomous travel management section 52, etc.

Figure 3:
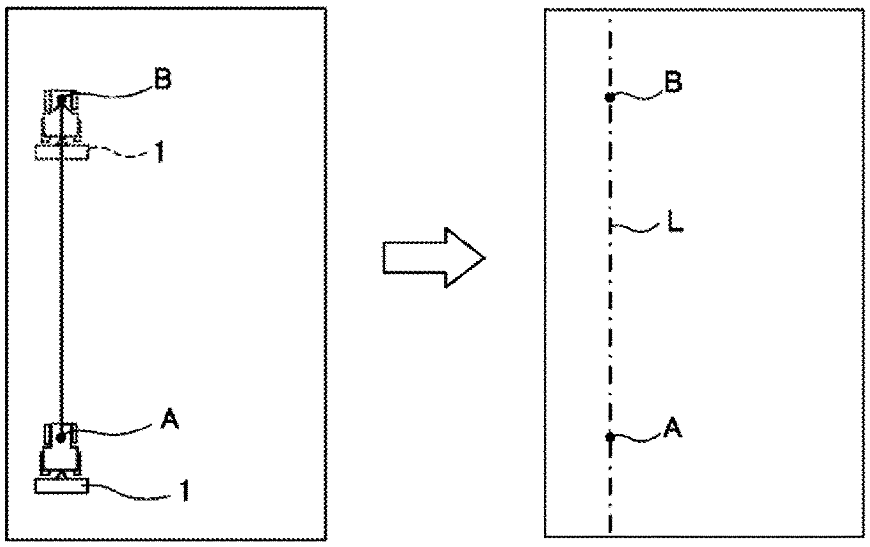
FIG. 3 is a view for explaining an example of a setting method of a baseline.

Here, an outline of the autonomous steering and traveling conducted by the tractor 1 of this embodiment is described. When conducting the autonomous steering and traveling, firstly, a baseline L is set. FIG. 3 is a view for explaining an example of a setting method of the baseline L. The setting method of the baseline L may be another method than the method shown in FIG. 3.

When setting the baseline L, firstly, the tractor 1 is moved to an appropriate position in a farm field (A point in FIG. 3) and the A point is registered. The registration of the A point is conducted by a registration command output by the driver. A position of the vehicle body 2 acquired using the position acquisition section 21 at the point of time of the output of the A point registration command is registered as a position of the A point.

After the registration of the A point, the driver manually manipulates the tractor 1 to travel forward to the predetermined position (B point in FIG. 3). Then, when the tractor 1 has reached the predetermined position, the B point is registered. The registration of the B point is conducted by the registration command output by the driver. The position of the vehicle body 2 acquired using the position acquisition section 21 at the point of time of the output of the B point registration command is registered as a position of the B point. Once the A point and the B point have registered, a straight line passing through the A point and the B point is set as the baseline L.

After the baseline L is set, lines parallel to the baseline L are generated at a predetermined interval as autonomous traveling lines. When conducting the autonomous steering and traveling, the steering control of the forward direction of the tractor 1 is conducted so that the autonomous traveling line and the position of the vehicle body 2 acquired using the position acquisition section 21 correspond to each other.

2. Layout of the Positioning Antenna

Figure 4:
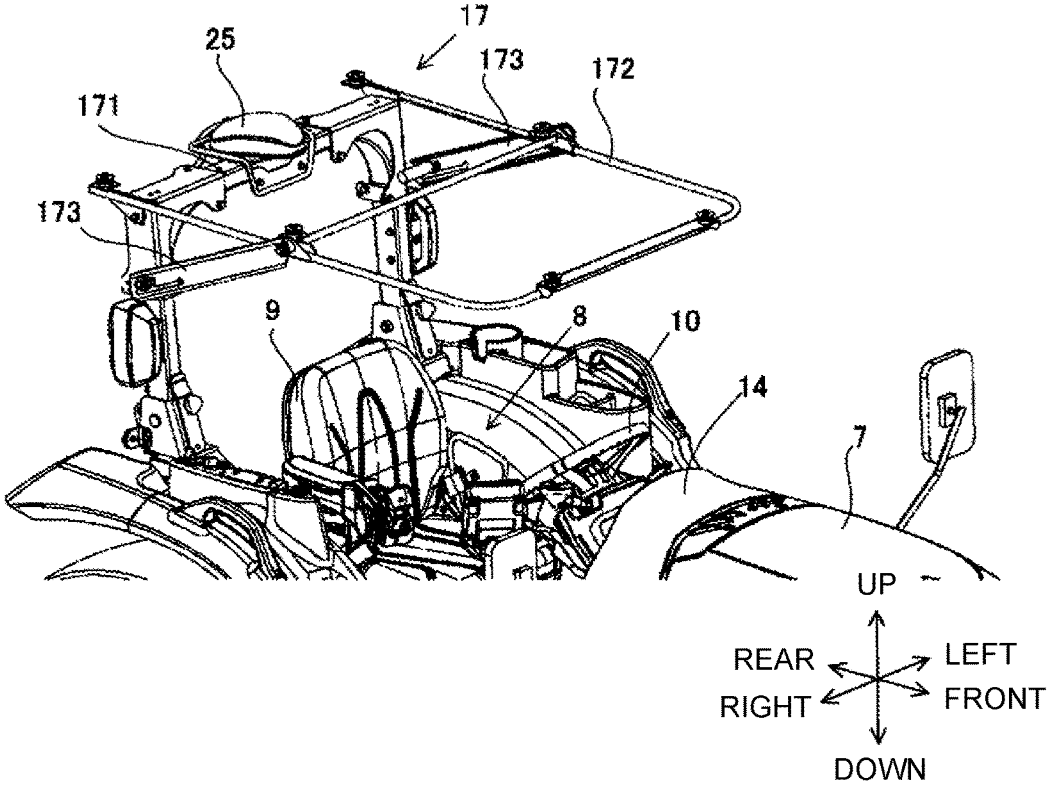
FIG. 4 is a view seen from obliquely above illustrating a periphery of a driver portion in which a canopy is removed from the tractor shown in FIG. 1.

FIG. 4 is a view seen from obliquely above illustrating a periphery of the driver portion 8 with the canopy 16 being removed from the tractor 1 shown in FIG. 1. As can be understood by comparing FIG. 1 and FIG. 4, the tractor 1 includes the positioning antenna 25 that is covered by the canopy 16 from above. Specifically, the positioning antenna 25 is configured so that an antenna element is accommodated in an antenna case that configures an outer shell. The antenna element includes, for example, a Global Navigation Satellite System (GNSS) antenna that is configured as a patch antenna, etc. Note that the positioning antenna 25 may be included in the tractor 1 as a positioning unit in which the positioning antenna 25 is integrated with the above-described position acquisition section 21.

In this embodiment, the positioning antenna 25 is mounted to the support portion 17. However, the positioning antenna 25 may be mounted to the canopy 16 instead of the support portion 17. In another case, the positioning antenna 25 may be mounted to both of the support portion 17 and the canopy 16. Further, when the positioning antenna 25 is configured as the positioning unit in which the positioning antenna 25 is integrated with the position acquisition section 21, the positioning unit may be mounted to the support portion 17, etc.

Figure 5:
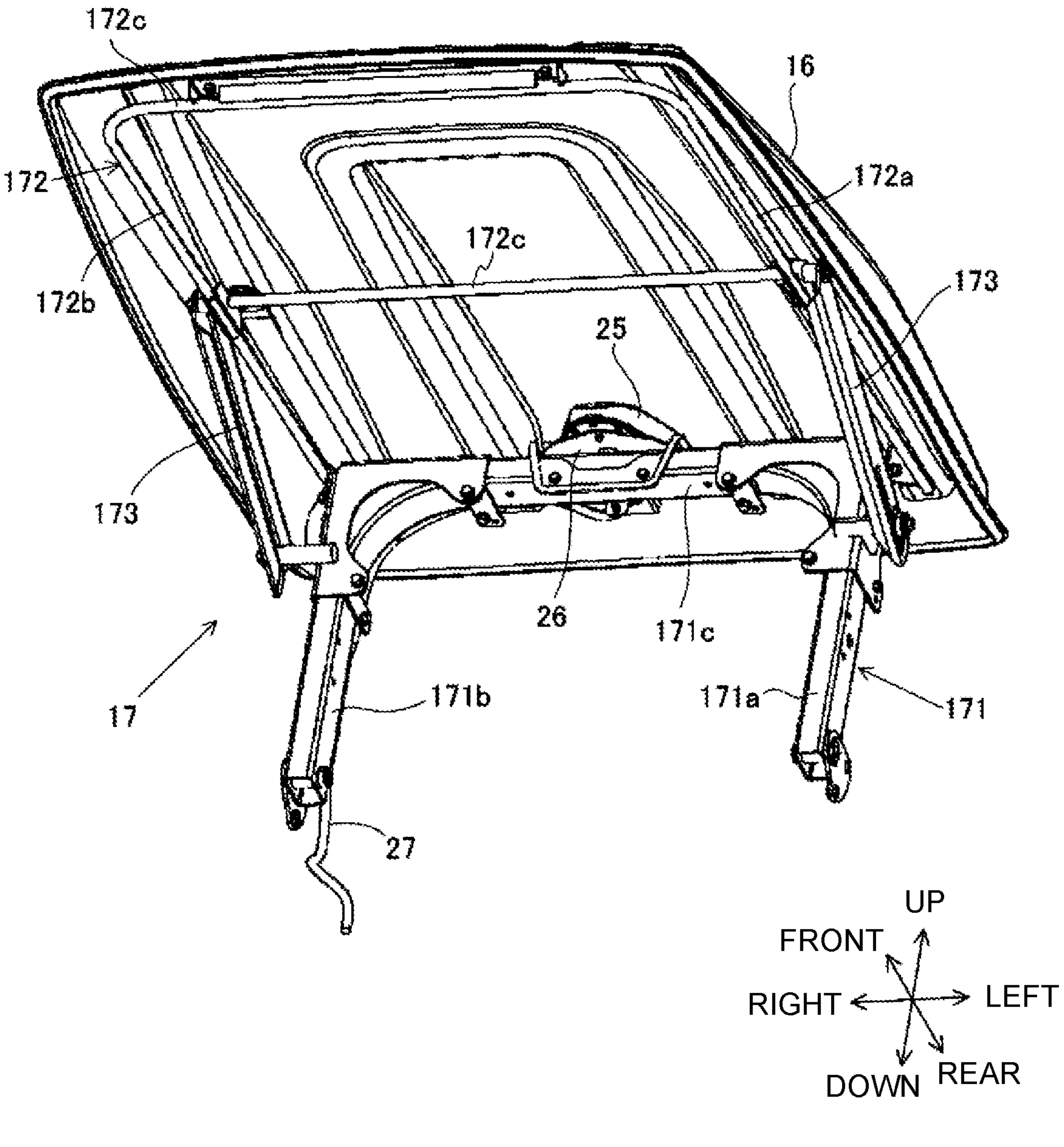
FIG. 5 is a schematic perspective view illustrating a relationship of the positioning antenna with the canopy and a support portion.

FIG. 5 is a schematic perspective view illustrating a relationship of the positioning antenna 25 with the canopy 16 and the support portion 17. FIG. 5 is a view seen from obliquely below. Before explaining the relationship of the positioning antenna 25 with the canopy 16 and the support portion 17, the canopy 16 and the support portion 17 will be specifically described.

[2-1. Canopy]

The canopy 16 is preferably made of resin. Although the canopy 16 may be made of a material other than resin, the canopy 16 is preferably made of a nonmetallic material. As shown in FIG. 5, the canopy 16 has a box shape that has an opening on its lower side. However, the canopy 16 may have a shape other than the box shape such as a plate shape. When seen from above, the canopy 16 has a rectangular shape. Specifically, when seen from above, the canopy 16 has a trapezoidal shape in which a length of a front edge in the left-right direction is a little shorter than a length of a rear edge in the left-right direction. However, the shape of the canopy 16 may be appropriately changed.

In this embodiment, as shown in FIG. 1, a top surface of the canopy 16 includes a first slant portion 161 that, when seen laterally, increases in height from the front to the rear. Further, the top surface of the canopy 16 includes a second slant portion 162 that, when seen laterally, is connected to the rear end of the first slant portion 161 and decreases in height from the front to the rear. By providing the top surface of the canopy 16 with the slant portions 161 and 162, it is possible that, for example, rainwater easily flows downward and dust such as leaves is prevented from accumulating on the canopy 16.

Specifically, a central portion in the left-right direction of the canopy 16 is different from end portions in the left-right direction of the canopy 16 in a position of a connection portion 163 where the first slant portion 161 and the second slant portion 162 connect to each other. A connection portion 163*b* at the central portion in the left-right direction of the canopy 16 is positioned behind connection portions 163*a* at the left and right end portions. The connection portion 163*b* at the central portion is positioned behind the rops 15. By the shape of the canopy 16 of this embodiment, the gap in the up-down direction between the central portion in the left-right direction of the rops 15 and the canopy 16 can be increased.

[2-2. Support Portion]

Figure 6:
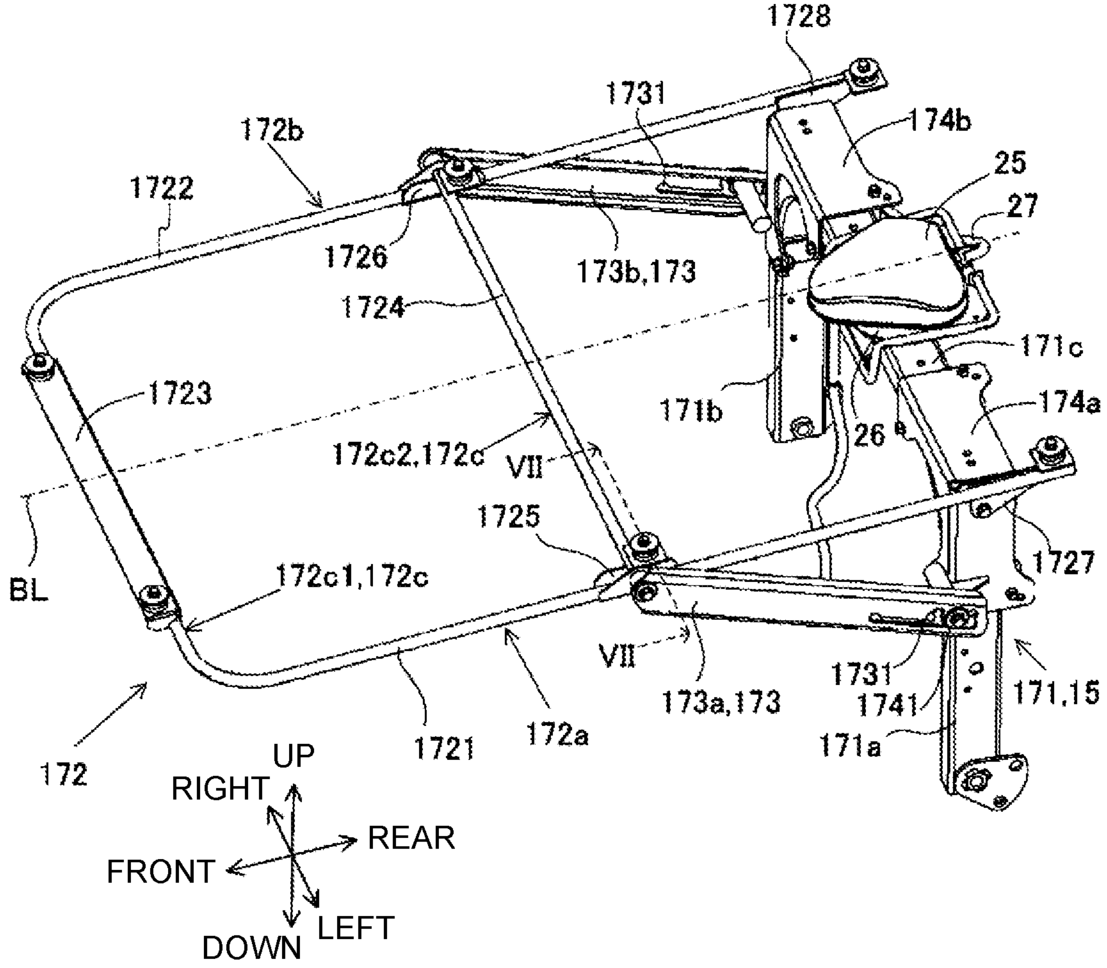
FIG. 6 is a perspective view illustrating a brief configuration of the support portion included in the tractor.

FIG. 6 is a perspective view illustrating a brief configuration of the support portion 17 included in the tractor 1 of this embodiment. Note that the positioning antenna 25 mounted to the support portion 17 is also illustrated in FIG. 6. As shown in FIG. 6, the support portion 17 includes a support column frame 171, a canopy fastening frame 172, and a support frame 173.

The support column frame 171 is disposed behind the driver's seat 9 (for example, see FIG. 4). In this embodiment, the support column frame 171 also serves as a frame that configures the rops 15 described above. Specifically, the support column frame 171 includes a left support column portion 171*a*, a right support column portion 171*b*, and a beam portion 171*c*. In this embodiment, the left support column portion 171*a*, the right support column portion 171*b*, and the beam portion 171*c* are a single member and, for example, made of metal. Note that, the support column frame 171 including the left support column portion 171*a*, the right support column portion 171*b*, and the beam portion 171*c* may be configured by a plurality of members.

Both of the left support column portion 171*a* and the right support column portion 171*b* are supported by the vehicle body 2 and extend upward from the vehicle body 2. The left support column portion 171*a* and the right support column portion 171*b* have a same height. The left support column portion 171*a* and the right support column portion 171*b* are disposed at the same position in the front-rear direction and are separated in the left-right direction. The beam portion 171*c* connects the upper end portion of the left support column portion 171*a* and the upper end portion of the right support column portion 171*b*. The beam portion 171*c* extends in the left-right direction. The support column frame 171 configured by the left support column portion 171*a*, the right support column portion 171*b*, and the beam portion 171*c* has a gate shape. Note that the support column frame 171 may be mounted on the vehicle body 2 so as to be rotatable around an axis extending in the horizontal direction.

The canopy fastening frame 172 is supported by the support column frame 171 and fastened to the canopy 16. Specifically, the canopy fastening frame 172 includes a pair of vertical frame portions 172*a*, 172*b* that extend in the front-rear direction and at least one lateral frame portion 172*c* that connects the pair of vertical frame portions 172*a*, 172*b* to each other.

In this embodiment, the pair of vertical frame portions 172*a*, 172*b* are disposed at the same height in the up-down direction and are separated from each other in the left-right direction. The lateral frame portion 172*c* includes a first lateral frame portion 172*c*1 that connects front ends of the pair of vertical frame portions 172*a*, 172*b* to each other. Further, the lateral frame portion 172*c* includes a second lateral frame portion 172*c*2 that connects central portions in the front-rear direction of the pair of vertical frame portions 172*a*, 172*b* to each other. That is, there are two lateral frame portions 172*c*. Both of the first lateral frame portion 172*c*1 and the second lateral frame portion 172*c*2 extend in the left-right direction.

Note that the pair of vertical frame portions 172*a*, 172*b*, and the at least one lateral frame portion 172*c* may be configured by a single member. However, in this embodiment, the pair of vertical frame portions 172*a*, 172*b*, and the at least one lateral frame portion 172*c* are configured by a plurality of members. The plurality of members include a left pipe 1721, a right pipe 1722, a front connection piece 1723, and a central pipe 1724. These members are, for example, made of metal.

The left pipe 1721 is configured by an L-shaped pipe member. The left pipe 1721 configures the left vertical frame portion 172*a* and a part of the first lateral frame portion 172*c*1. The right pipe 1722 is configured by an L-shaped pipe member. The right pipe 1722 configures the right vertical frame portion 172*b* and another part of the first lateral frame portion 172*c*1. The left pipe 1721 and the right pipe 1722 are disposed symmetrically to each other about a bisector line BL that bisects the canopy fastening frame 172 in the left-right direction.

The front connection piece 1723 is connected to a portion of the left pipe 1721 that configures the part of the first lateral frame portion 172*c*1 and a portion of the right pipe 1722 that configures the another part of the first lateral frame portion 172*c*1. That is, the first lateral frame portion 172*c*1 is configured by the part of the left pipe 1721, the part of the right pipe 1722, and the front connection piece 1723. Note that the first lateral frame portion may be configured by a U-shaped single member including the left pipe 1721 and the right pipe 1722. In this case, the front connection piece 1723 may be omitted.

The central pipe 1724 configures the second lateral frame portion 172*c*2. A left pipe support 1725 is disposed at the central portion in the front-rear direction of the portion configuring the vertical frame portion 172*a* of the left pipe 1721. A right pipe support 1726 is disposed at the central portion in the front-rear direction of the portion configuring the vertical frame portion 172*b* of the right pipe 1722. A left end of the central pipe 1724 is mounted to the left pipe support 1725 and a right end of the central pipe 1724 is mounted to the right pipe support 1726. For example, the left pipe support 1725 and the right pipe support 1726 are made of metal.

The rear end of the portion configuring the vertical frame portion 172*a* of the left pipe 1721 is provided with a left rear connector 1727. The rear end of the portion configuring the vertical frame portion 172*b* of the right pipe 1722 is provided with a right rear connector 1728.

The left rear connector 1727 is mounted to the left support column portion 171*a* of the support column frame 171 via a left frame adapter 174*a*. The right rear connector 1728 is mounted to the right support column portion 171*b* of the support column frame 171 via a right frame adapter 174*b*. For example, the left rear connector 1727, the right rear connector 1728, the left frame adapter 174*a*, and the right frame adapter 174*b* are made of metal.

Note that the left frame adapter 174*a* has an L shape when seen from the front and is disposed so as to cover a front surface and a left side surface of the upper portion of the left support column portion 171*a* and a front surface and an upper surface of the left portion of the beam portion 171*c*. The right frame adapter 174*b* has an L shape when seen from the front and is disposed so as to cover a front surface and a right side surface of the upper portion of the right support column portion 171*b* and a front surface and an upper surface of the right portion of the beam portion 171*c*.

Further, in this embodiment, the left rear connector 1727 may be mounted to the left frame adapter 174*a* so as to be rotatable around an axis extending in the left-right direction. The right rear connector 1728 may be connected to the right frame adapter 174*b* so as to be rotatable around an axis extending in the left-right direction. That is, rear ends of the left pipe 1721 and the right pipe 1722 are mounted to the support column frame 171 so as to be rotatable around an axis extending in the left-right direction. The canopy fastening frame 172 is mounted to the support column frame 171 so as to be able to oscillate in the up-down direction. Note that the canopy fastening frame 172 may be mounted to the support column frame 171 so as not to oscillate.

The support frame 173 positions the canopy fastening frame 172 on the support column frame 171 and support the canopy fastening frame 172. Specifically, the support frame 173 includes a left support frame 173*a* and a right support frame 173*b*. Each of the left support frame 173*a* and the right support frame 173*b* is a slim sheet metal having a U-shaped cross-section. Each of the left support frame 173*a* and the right support frame 173*b* is obliquely disposed so that its front end is higher than its rear end. A position adjusting aperture 1731 is provided so as to pass through the rear portion of each of the left support frame 173*a* and the right support frame 173*b* in the left-right direction. The position adjusting apertures 1731 make it possible to adjust the position of the canopy fastening frame 172 with respect to the support column frame 171.

The front end of the left support frame 173*a* is fixed to the left pipe support 1725 by a fixture such as a screw. The rear portion of the left support frame 173*a* is fixed to the support column frame 171 by fitting, at an appropriate position in the position adjusting aperture 1731, a pin member 1741 that is fixed to the left frame adapter 174*a* and extends in the left-right direction. Further, the front end of the right support frame 173*b* is fixed to the right pipe support 1726 by a fixture such as a screw. The rear portion of the right support frame 173*b* is fixed to the support column frame 171 by fitting, at an appropriate position in the position adjusting aperture 1731, a pin member 1741 that is fixed to the right frame adapter 174*b* and extends in the left-right direction.

The position of the canopy fastening frame 172 with respect to the support column frame 171 can be adjusted by adjusting a fitting position of the pin member 1741 in the position adjusting aperture 1731 on each of the left and right support frame 173. In other words, an angle of the canopy 16 fastened to the canopy fastening frame 172 with respect to the horizontal plane can be changed by adjusting the fitting position of the pin member 1741 to the position adjusting aperture 1731.

Figure 7:
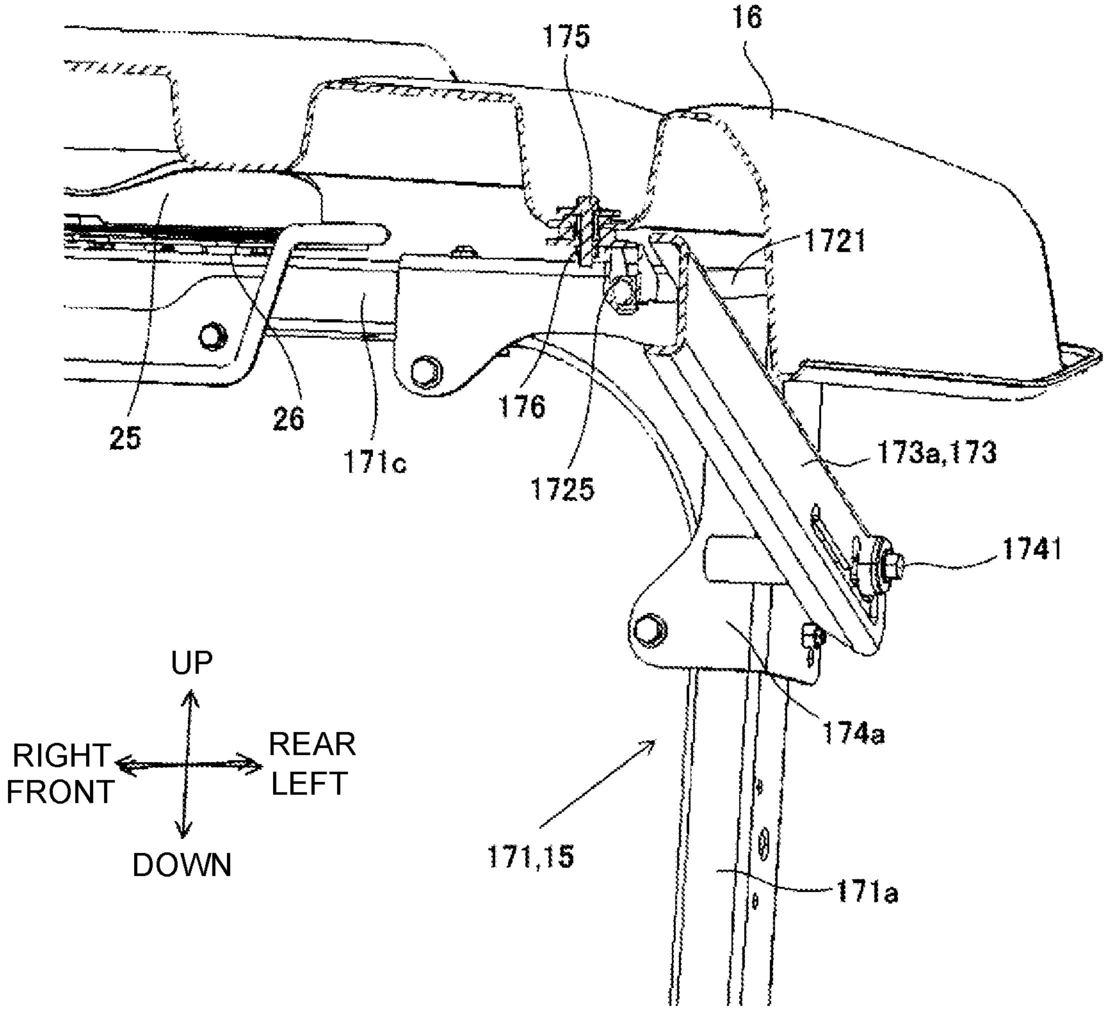
FIG. 7 is a view for explaining a relationship between the canopy and a canopy fastening frame.

FIG. 7 is a view for explaining a relationship between the canopy 16 and the canopy fastening frame 172. FIG. 7 is a schematic sectional view seen at the VII-VII point in FIG. 6 with the canopy 16 being fastened to the canopy fastening frame 172. As shown in FIG. 7, the canopy 16 and the canopy fastening frame 172 are fastened to each other by bolts 175 and nuts 176.

The canopy 16 and the canopy fastening frame 172 are fastened at six positions in this embodiment. The six positions include two positions at the left end and the right end of the front connection piece 1723, and fastening positions that are respectively provided on the left pipe support 1725, the right pipe support 1726, the left rear connector 1727, and the right rear connector 1728. However, the number and disposition of the fastening positions may be appropriately changed. Further, the fastening members for fastening the canopy 16 and the canopy fastening frame 172 may be other than the bolts 175 and the nuts 176.

[2-3. Detail of the Layout of the Positioning Antenna]

As can be understood with reference to FIG. 4 to FIG. 7, the positioning antenna 25 is disposed below the canopy 16 and above the support portion 17. In other words, the positioning antenna 25 is disposed between the canopy 16 and the support portion 17 in the up-down direction. By configuring as above, the positioning antenna 25 can be covered by the canopy 16 and the positioning antenna 25 can be prevented from colliding with an obstruction existing above the tractor 1. The obstruction may be, for example, a tree branch or a roof of a building for accommodating the tractor 1, etc. Further, by disposing the positioning antenna 25 above the support portion 17, the support portion 17 can be prevented from disrupting the signal reception by the positioning antenna 25.

Note that, in this embodiment, the support portion 17 is made of metal and the support portion 17 may disrupt reception of a radio wave. On the other hand, the canopy 16 is made of resin and the canopy 16 hardly disrupts reception of a radio wave.

In this embodiment, the positioning antenna 25 is supported by the support column frame 171. That is, the positioning antenna 25 is supported by the frame that configures the rops 15. By configuring as above, the positioning antenna 25 can be disposed behind the driver's seat 9. Further, since the positioning antenna 25 is disposed above the support column frame 171, the support column frame 171 can be prevented from disrupting signal reception by the positioning antenna 25.

Figure 8:
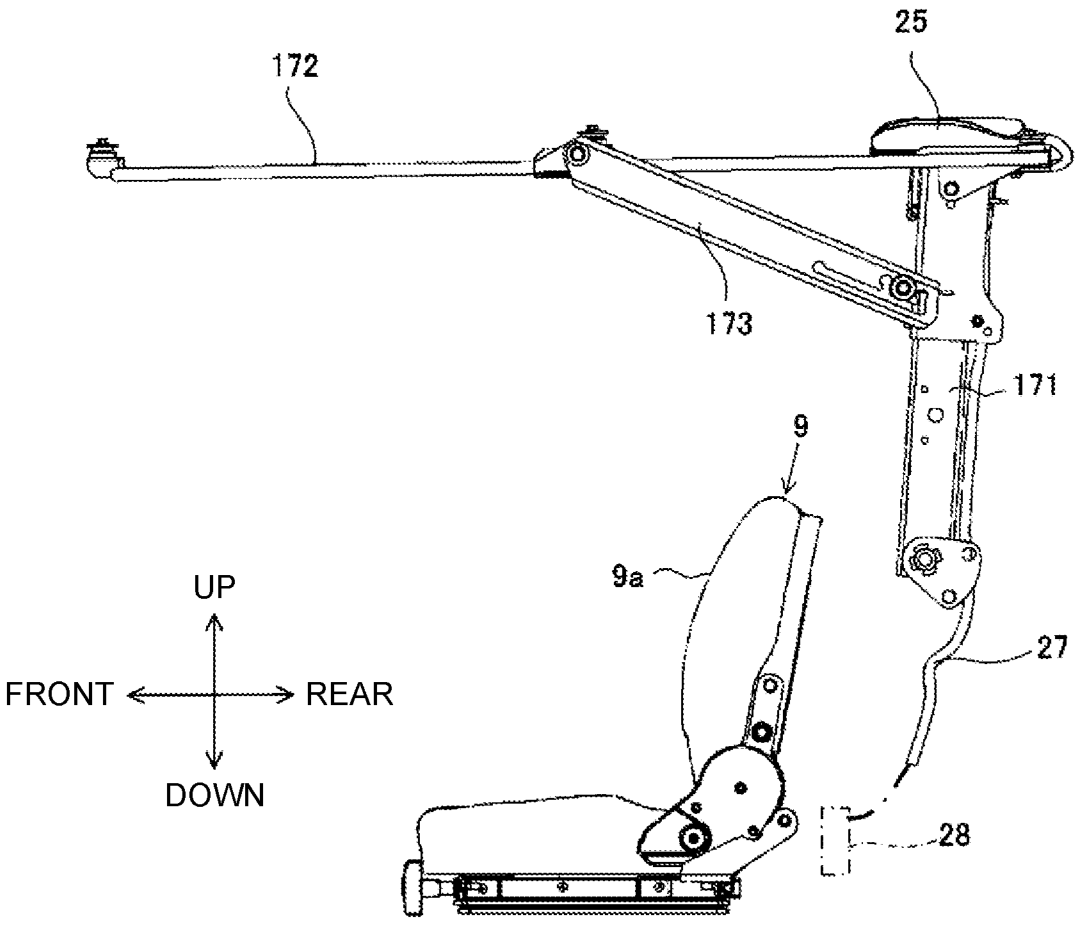
FIG. 8 is a schematic side view illustrating a relationship between the positioning antenna and a driver's seat.

FIG. 8 is a schematic side view illustrating a relationship between the positioning antenna 25 and the driver's seat 9. As shown in FIG. 8, in this embodiment, the positioning antenna 25 is disposed behind a backrest surface 9*a* of the driver's seat 9. Note that the backrest surface 9*a* is a surface against which the driver sitting on the driver's seat 9 can lean back. By disposing the positioning antenna 25 behind the backrest surface 9*a*, the possibility that the positioning antenna 25 contacts to the body of the driver when the driver gets on and off the driver portion 8 or the driver rises to his/her feet. Note that the positioning antenna 25 can be configured to be disposed behind a seat base point. The seat base point is defined by ISO (ISO5353) or JIS (JISA8318), etc. and the seat base point is a base point of the seat defined, in theory, near a joint between the trunk and the femur of the driver.

Specifically, the positioning antenna 25 is disposed on the top surface of the beam portion 171*c* that configures the support column frame 171. The positioning antenna 25 is disposed at the central portion in the left-right direction of the beam portion 171*c*. The positioning antenna 25 is mounted on the top surface of the beam portion 171*c* via a base frame 26. The positioning antenna 25 is fixed to the base frame 26 by fixing means such as a screw. The base frame 26 is fixed to the beam portion 171*c* by fixing means such as a screw. Note that the base frame 26 is not a necessary component. Further, the positioning base point of the positioning antenna 25 that is disposed on the top surface of the beam portion 171*c* is preferably disposed in front of the rear end of the beam portion 171*c* (that is, the rear end of the support column frame 171).

In this embodiment, as shown, for example, in FIG. 8, a wiring member 27 extends from the rear end portion of the positioning antenna 25. The wiring member 27 is specifically a wire harness in which a plurality of electric wires are bundled. Note that the wiring member 27 may be a cable. The wiring member 27 is connected to a signal processing device 28. That is, the tractor 1 includes the signal processing device 28 that is connected to the positioning antenna 25 by the wiring member 27. The signal processing device 28 receives a signal from the positioning antenna 25 and processes the received signal. Note that the signal processing device 28 is, for example, the position acquisition section 21 described above or a control device that includes the position acquisition section 21. In this embodiment, the signal processing device 28 is disposed behind the driver's seat 9. However, the position of the signal processing device 28 may be appropriately changed. The signal processing device 28 is preferably disposed at the position where the signal processing device 28 does not disrupt the field of view of the driver.

Figure 9:
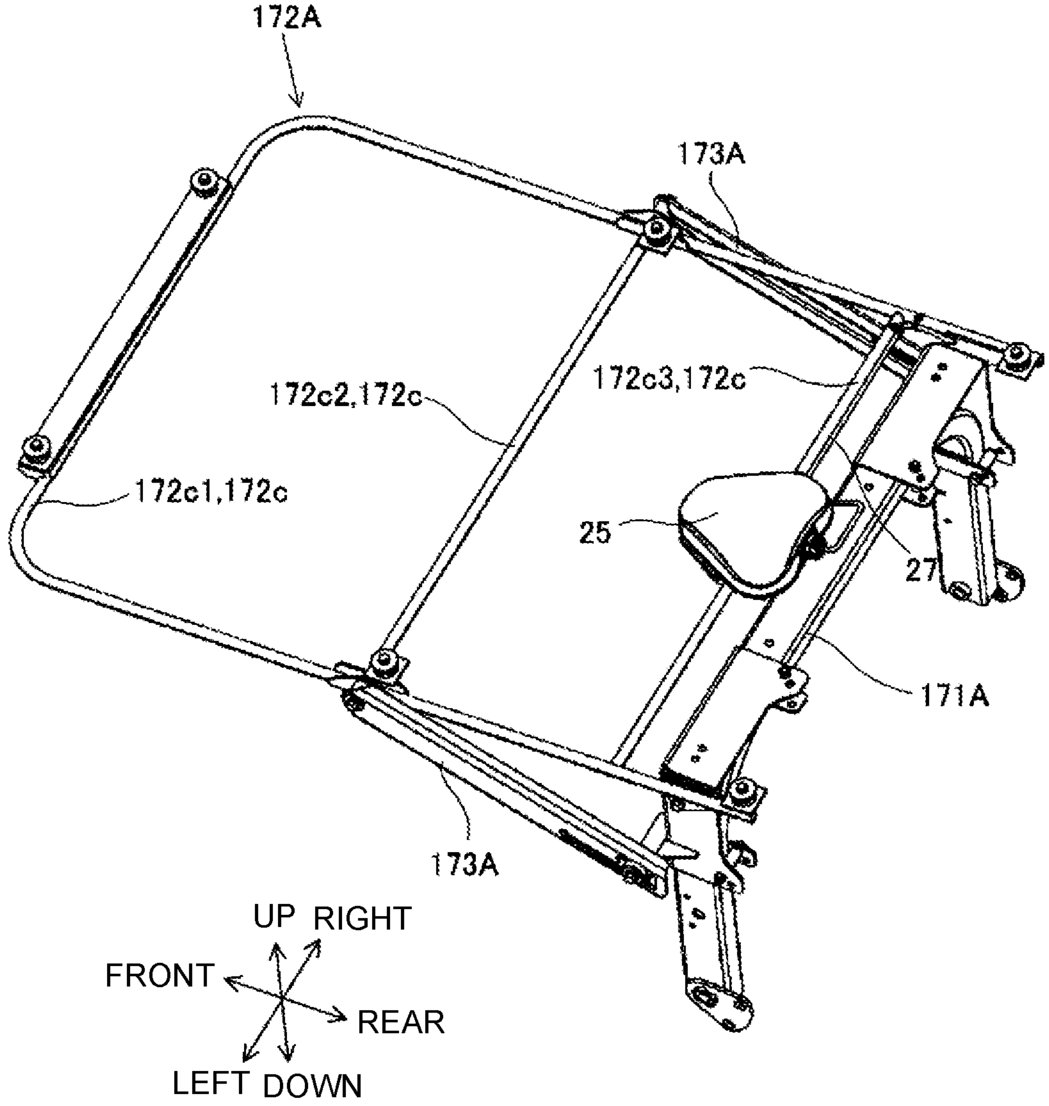
FIG. 9 is a perspective view illustrating a brief configuration of a support portion according to a modified example.

As shown in FIG. 9 described below, etc., the wiring member 27 is disposed along the support portion 17. In this embodiment, the wiring member 27 is disposed along the support column frame 171. By configuring as above, the wiring member 27 can be disposed below the canopy 16. As a result, the wiring member 27 can be protected from an obstruction such as, for example, a tree branch. Further, since the wiring member 27 does not protrude to an outside of the tractor 1, the external appearance of the tractor 1 can be increased.

Note that, in this embodiment, the wiring member 27 is disposed along an outside of the support portion 17. In this case, the wiring member 27 may be fixed to the support portion 17 using, for example, a band member, etc. However, in a case where, for example, the support portion 17 is configured by a hollow member, the wiring member 27 may be disposed along an inside of the support portion 17.

3. Modified Example

The layout of the above-described positioning antenna 25 is an example. A modified example of the layout of the positioning antenna 25 will be described.

3-1. First Modified Example

Figure 10:
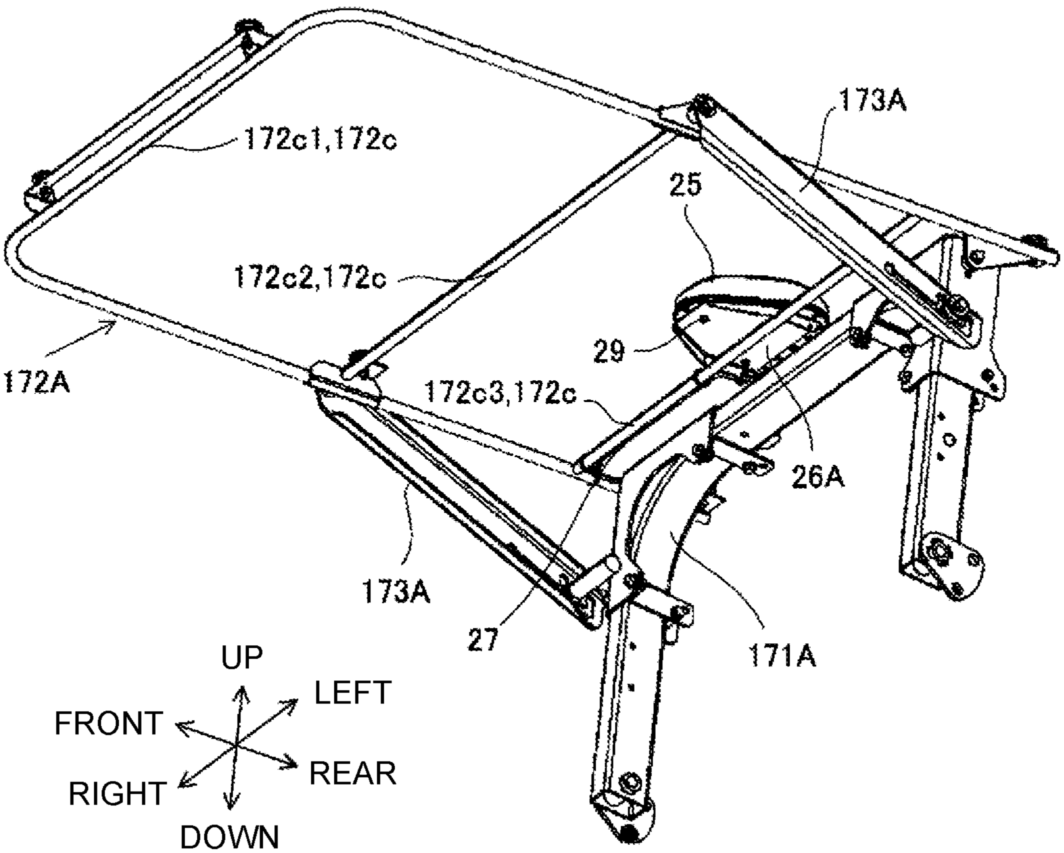
FIG. 10 is a perspective view illustrating the brief configuration of the support portion according to the modified example.

FIG. 9 and FIG. 10 are perspective views each illustrating a schematic configuration of a support portion 17A according to the modified example. FIG. 9 is a view in which the support portion 17A is seen from obliquely above. FIG. 10 is a view in which the support portion 17A is seen from obliquely below. Note that the positioning antenna 25 mounted to the support portion 17A is also illustrated in FIG. 9 and FIG. 10.

The configuration of the support portion 17A according to the modified example is generally similar to the configuration of the support portion 17 of the above described embodiment. The support portion 17A includes a support column frame 171A, a canopy fastening frame 172A, and a support frame 173A. The configurations of the support column frame 171A and the support frame 173A are same as the configurations of the support column frame 171 and the support frame 173 described above.

The configuration of the canopy fastening frame 172A is slightly different from the configuration of the canopy fastening frame 172 described above.

In the lateral frame portions 172*c* that connects the pair of vertical frame portions 172*a*, 172*b* to each other, the canopy fastening frame 172 includes a third lateral frame portion 172*c*3 in addition to the first lateral frame portion 172*c*1 and the second lateral frame portion 172*c*2. The canopy fastening frame 172 is different from that of the above-described embodiment in that the third lateral frame portion 172*c*3 is further included.

The third lateral frame portion 172*c*3 is configured by a pipe member that extends in the left-right direction. The third lateral frame portion 172*c*3 is mounted to the pair of vertical frame portions 172*a*, 172*b* by, for example, a fixture or welding. The third lateral frame portion 172*c*3 is disposed behind the second lateral frame portion 172*c*2. The third lateral frame portion 172*c*3 is disposed in front of the support column frame 171A.

As shown in FIG. 9 and FIG. 10, in this modified example, the positioning antenna 25 is supported by the canopy fastening frame 172A. Note that, also in this modified example, the positioning antenna 25 is disposed below the canopy 16 and above the support portion 17A.

In the configuration described above, the canopy 16 and the positioning antenna 25 are configured to be mounted to the same structure (canopy fastening frame 172A). In this configuration, the distance between the positioning antenna 25 and the canopy 16 can be stabler than the configuration in which the canopy 16 and the positioning antenna 25 are respectively mounted to different structures. As a result, a required design value of the gap between the positioning antenna 25 and the canopy 16 can be decreased and the height of the canopy 16 can be decreased. Further, in the configuration in which the canopy 16 and the positioning antenna 25 are mounted to the canopy fastening frame 172A, when the canopy fastening frame 172A is rotated in the up-down direction for adjusting the position of the canopy 16, the positioning antenna 25 is also moved along with the canopy 16. Therefore, when adjusting the position of the canopy 16, it can be prevented that the canopy 16 contacts to the positioning antenna 25.

Specifically, the positioning antenna 25 is supported by the lateral frame portion 172*c*. More specifically, the positioning antenna 25 is supported by the third lateral frame portion 172*c*3. The positioning antenna 25 is disposed behind a backrest surface 9*a* of the driver's seat 9 (see FIG. 8) and in front of the rear end of the support column frame 171A. By disposing the positioning antenna 25 behind the backrest surface 9*a*, it can be prevented that the positioning antenna 25 contacts to the body of the driver when the driver gets on and off the driver portion 8 or the driver rises to his/her feet. Further, in the configuration in which the positioning antenna 25 is disposed in front of the rear end of the support column frame 171A, when the rear portion of the canopy 16 contacts to an obstruction while, for example, reversing the tractor 1, etc., it can be prevented that the positioning antenna 25 is sandwiched between the support column frame 171A and the obstruction. Further, in the configuration in which the positioning antenna 25 is disposed in front of the rear end of the support column frame 171A, when adjusting the position of the canopy 16, the possibility that the positioning antenna 25 is sandwiched between the canopy 16 and the support column frame 171A can be decreased. Note that, also in this modified example, the positioning antenna 25 is preferably disposed behind the seat base point. Further, the positioning base point of the positioning antenna 25 is preferably disposed in front of the rear end of the support column frame 171A. However, the positioning antenna 25 may be disposed behind the support column frame 171A. In this case, the third lateral frame portion 172*c*3 that supports the positioning antenna 25 may be configured to be disposed behind the support column frame 171A.

In this modified example, the positioning antenna 25 is disposed at the central portion in the left-right direction of the lateral frame portion 172*c*. The positioning antenna 25 is mounted to the third lateral frame portion 172*c*3 via the base frame 26A. The positioning antenna 25 is fixed to the base frame 26A by using a fastening member 29 such as a screw. The base frame 26A is fixed to the third lateral frame portion 172*c*3 by, for example, a fixture or welding, etc. That is, the positioning antenna 25 is fastened to the tractor 1 by the fastening member 29 and the tractor 1 includes the base frame 26A that is mounted to the lateral frame portion 172*c*.

Note that, although the base frame 26A is configured to be fixed to the lateral frame portion 172*c* in this modified example, this configuration is an example. The base frame 26A may be rotatably mounted to the lateral frame portion 172*c*. In other words, the positioning antenna 25 may be rotatably mounted to the support portion 17A. By configuring as above, for example, the maintainability of the positioning antenna 25 can be increased. The positioning antenna 25 rotatably mounted to the support portion 17A is preferably provided so as to be rotatable around an axis extending along the horizontal direction. By rotating the positioning antenna 25, the positioning antenna can be disposed at a lower position.

Figure 11:
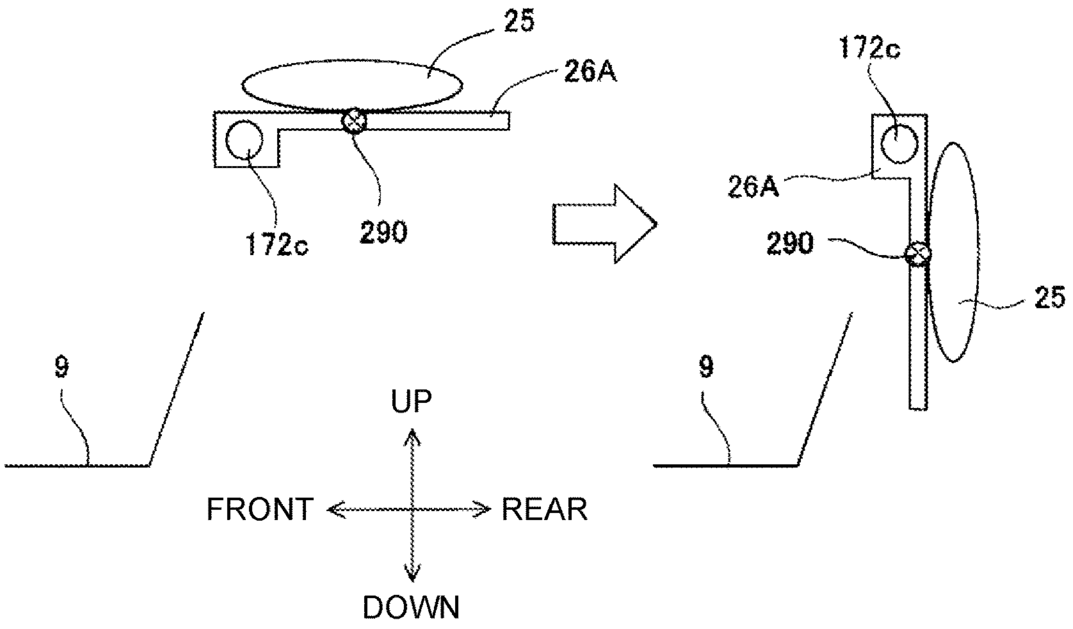
FIG. 11 is a schematic view illustrating an example configuration in which the positioning antenna is movably mounted to the support portion.

FIG. 11 is a schematic view illustrating an example configuration in which the positioning antenna 25 is rotatably mounted to the support portion 17A. As shown in FIG. 11, the base frame 26A can be provided so as to be rotatable around an axis extending along the horizontal direction between an upper position and a lower position. Note that the upper position is a normal state shown in the left side of FIG. 11 in which the positioning antenna 25 is used. The lower position is a maintenance state shown in the right side of FIG. 11 in which a maintenance, etc. is to be conducted. The axis specifically extends along the left-right direction.

In the upper position, a fastening portion 290 between the positioning antenna 25 and the base frame 26A faces downward. In the lower position, the fastening portion 290 faces a side of the driver's seat 9. Note that the fastening portion 290 is a portion at which the positioning antenna 25 and the base frame 26A are fastened by the fastening member 29, and there may be one or a plurality of the fastening portions 290. By configuring as above, a removal or a maintenance of the positioning antenna 25 can be easily conducted.

Figure 12:
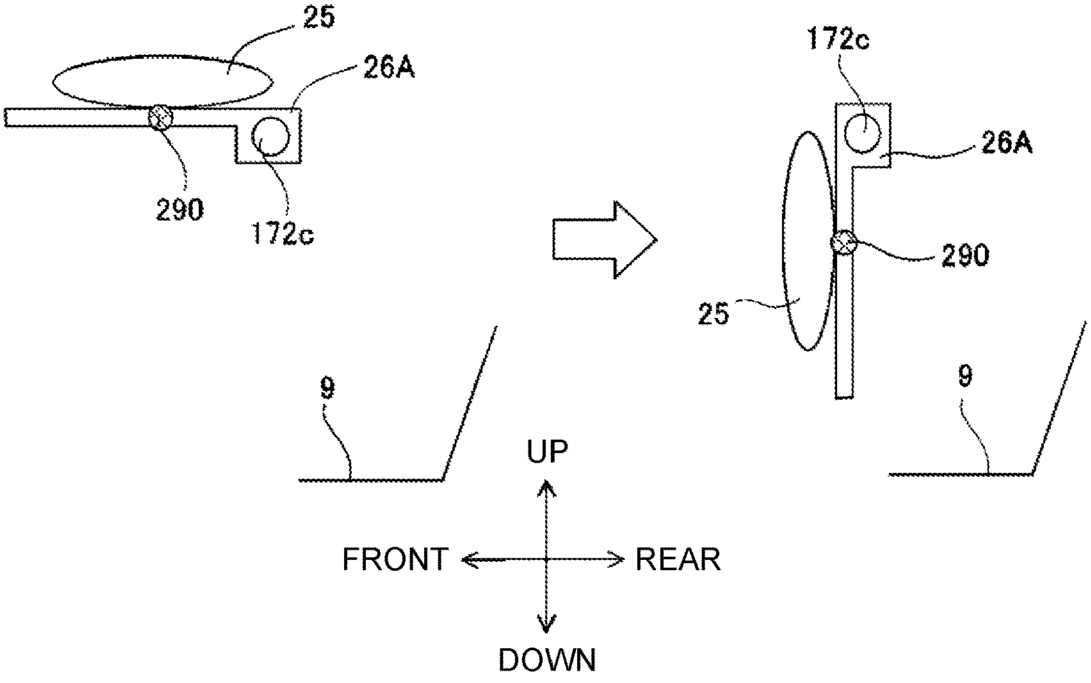
FIG. 12 is a schematic view illustrating another example configuration in which the positioning antenna is movably mounted to the support portion.

Note that, in the modified example shown in FIG. 9 and FIG. 10, the positioning antenna 25 is configured to be mounted to the third lateral frame portion 172*c*3. However, the positioning antenna 25 may be mounted to another lateral frame portion 172*c*, such as, for example, the first lateral frame portion 172*c*1 or the second lateral frame portion 172*c*2, etc. For example, in a case where the positioning antenna 25 is rotatably mounted to the lateral frame portion 172*c* disposed in front of the canopy fastening frame 172A, the positioning antenna 25 can be configured as shown in FIG. 12. Note that FIG. 12 is a schematic view illustrating another example of a configuration in which the positioning antenna 25 is rotatably mounted to the support portion 17A.

In the example shown in FIG. 12, since the directional relationship of the positioning antenna 25 with respect to the driver's seat 9 in the front-rear direction is reversed with respect to the example shown in FIG. 11, the direction of rotation of the base frame 26A from the upper position to the lower position is reversed. That is, in the example shown in FIG. 11, the base frame 26A rotates in a clockwise direction when moving from the upper position to the lower position. On the other hand, in the example shown in FIG. 12, the base frame 26A rotates in a counter-clockwise direction when moving from the upper position to the lower position. By configuring as above, even if the positioning antenna 25 is disposed in front of the driver's seat 9, it can be configured that, in the upper position, the fastening portion 290 between the positioning antenna 25 and the base frame 26A faces downward, and in the lower position, the fastening portion 290 faces the side of the driver's seat 9.

With reference again to FIG. 9 and FIG. 10, also in the first modified example, similarly to the above described embodiment, a wiring member 27 extends from the rear end portion of the positioning antenna 25. The wiring member 27 is disposed along the lateral frame portion 172*c*. In the example shown in FIG. 9 and FIG. 10, the wiring member 27 is disposed along the third lateral frame portion 172*c*3. Further, in this example, although the wiring member 27 is disposed along the outside of the lateral frame portion 172*c*, the wiring member 27 may be disposed along the inside of the lateral frame portion 172*c*.

3-2. Second Modified Example

The positioning antenna 25 may be disposed so that the position of at least a part of the positioning antenna 25 in the front-rear direction is same as the position of a rear axle 102 (see FIG. 1). In other words, the positioning antenna 25 may be disposed at the position where, when seen from above, the positioning antenna 25 overlaps with the rear axle 102. Note that the rear axle 102 is an axle of the rear wheels 6 of the tractor 1. In the configuration of the second modified example, when the position of the vehicle body 2 is configured to be controlled based on the rear axle 102, the control can be easily conducted.

3-3. Third Modified Example

The positioning antenna 25 may be disposed at the central portion in the front-rear direction of the vehicle. The central portion in the front-rear direction of the vehicle is, for example, the central portion between the front end and the rear end of the vehicle body 2. Further, central portion in the front-rear direction of the vehicle may be a portion that, when seen from the above, overlaps with the central portion in the front-rear direction between a front axle 101 (see FIG. 1) and the rear axle 102. That is, the positioning antenna 25 may be disposed at the position that, when seen from above, overlaps with the central portion in the front-rear direction between the front axle 101 and the rear axle 102. Note that the front axle 101 is an axle of the front wheels 5 of the tractor 1. In the configuration of the third modified example, the positioning antenna 25 can be disposed at the position where the positioning antenna 25 is hardly affected by the tilt of the vehicle body 2. Further, in the configuration of the third modified example, when the position of the vehicle body 2 is configured to be controlled based on the central portion in the front-rear direction of the vehicle, the control can be easily conducted.

4. Consideration, Etc

A variety of technical features disclosed in this specification can be changed in various ways without departing from the spirit of the technical creation. Further, a plurality of embodiments and modified examples may be combined with each other within a possible range.

5. Supplementary Note

An example work vehicle of the present invention may be a configuration (first configuration) including: a driver's seat; a canopy that is disposed above the driver's seat; a support portion that supports the canopy; a positioning antenna that receives a signal from a positioning satellite; wherein the positioning antenna is disposed below the canopy and above the support portion.

The first configuration may be a configuration (second configuration) wherein: the support portion includes a support column frame that is disposed behind the driver's seat; and the positioning antenna is supported by the support column frame.

The first configuration may be a configuration (third configuration) wherein: the support portion includes: a support column frame that is disposed behind the driver's seat; and a canopy fastening frame that is supported by the support column frame and fastened to the canopy; and the positioning antenna is supported by the canopy fastening frame.

The third configuration may be a configuration (fourth configuration) wherein: the canopy fastening frame includes: a pair of vertical frame portions that extend in a front-rear direction; and at least one lateral frame portion that connects the pair of vertical frame portions to each other; and the positioning antenna is supported by the lateral frame portion.

Any one of the first to fourth configurations may be a configuration (fifth configuration) wherein the positioning antenna is disposed behind a backrest surface of the driver's seat.

Any one of the second to fourth configurations may be a configuration (sixth configuration) wherein the positioning antenna is disposed behind a backrest surface of the driver's seat and in front of a rear end of the support column frame.

Any one of the first to sixth configurations may be a configuration (seventh configuration) including: a signal processing device that is connected to the positioning antenna by a wiring member; wherein the wiring member is disposed along the support portion.

Any one of the first to seventh configurations may be a configuration (eighth configuration) wherein the positioning antenna is rotatably mounted to the support portion.

The fourth configuration may be a configuration (ninth configuration) including: a base frame to which the positioning antenna is fastened by a fastening member and that is mounted to the lateral frame portion; wherein the base frame is provided so as to be rotatable around an axis extending in a horizontal direction between an upper position and a lower position; in the upper position, a fastening portion between the positioning antenna and the base frame faces downward; and in the lower position, the fastening portion faces a side of the driver's seat.

Any one of the first to ninth configurations may be a configuration (tenth configuration) wherein: at least a part of the positioning antenna is positioned in a same position as a position of a rear axle in a front-rear direction.

Any one of the first to ninth configurations may be a configuration (eleventh configuration) wherein: the positioning antenna is disposed at a central portion in a front-rear direction of the vehicle.

REFERENCE SIGNS LIST

1 . . . tractor (work vehicle)
9 . . . driver's seat
9*a* . . . backrest surface
16 . . . canopy
17, 17A . . . support portion
25 . . . positioning antenna
26, 26A . . . base frame
27 . . . wiring member
28 . . . signal processing device
29 . . . fastening member
101 . . . rear axle
171, 171A . . . support column frame
172, 172A . . . canopy fastening frame
172*a*, 172*b* . . . vertical frame portion
173*c* . . . lateral frame portion
290 . . . fastening portion

The invention claimed is:

1. A work vehicle comprising:
a driver's seat;
a canopy that is disposed above the driver's seat;
a support portion that supports the canopy; and
a positioning antenna that receives a signal from a positioning satellite;
wherein the positioning antenna is disposed below the canopy, and the support portion comprises:
a support column frame that is disposed behind the driver's seat;
a canopy fastening frame that is supported by the support column frame and fastened to the canopy;
the positioning antenna is supported by the canopy fastening frame, and
at least a part of the positioning antenna is positioned in a same position as a position of a rear axle in a front-rear direction.

2. The work vehicle according to claim 1, wherein:
the canopy fastening frame comprises:
a pair of frame portions that extend in a front-rear direction; and
at least one lateral frame portion that connects the pair of frame portions to each other; and
the positioning antenna is supported by the lateral frame portion.

3. The work vehicle according to claim 1, wherein the positioning antenna is disposed behind a backrest surface of the driver's seat.

4. The work vehicle according to claim 1, wherein the positioning antenna is disposed behind a backrest surface of the driver's seat and in front of a rear end of the support column frame.

5. The work vehicle according to claim 1, comprising:
a signal processing device that is connected to the positioning antenna by a wiring member;
wherein the wiring member is disposed along the support portion.

6. The work vehicle according to claim 1, wherein the positioning antenna is rotatably mounted to the support portion.

7. The work vehicle according to claim 2, comprising:

a base frame to which the positioning antenna is fastened by a fastening member and that is mounted to the lateral frame portion;

wherein the base frame is provided so as to be rotatable around an axis extending in a horizontal direction between an upper position and a lower position;

in the upper position, a fastening portion between the positioning antenna and the base frame faces downward; and in the lower position, the fastening portion faces a side of the driver's seat.

8. The work vehicle according to claim 1, wherein:

the positioning antenna is disposed at a central portion of the canopy fastening frame.

9. A work vehicle according to claim 1, wherein the positioning antenna is disposed on a lateral frame portion.

* * * * *